(12) United States Patent
Garcia Martinez et al.

(10) Patent No.: US 12,016,342 B2
(45) Date of Patent: Jun. 25, 2024

(54) CELLULOSE CASING, METHOD OF OBTAINING IT AND PRODUCT STUFFED IN SAID CASING

(71) Applicant: VISCOFAN, S.A., Tajonar (ES)

(72) Inventors: Ion Inaki Garcia Martinez, Atarrabia (ES); Alfonso Razquin Ongay, Pamplona (ES); Joana Jimenez Fuentes, Santacara (ES); Carlos Maria Longo Areso, Zizur (ES)

(73) Assignee: VISCOFAN, S.A., Tajonar (ES)

( * ) Notice: Subject to any disclaimer, the term of this patent is extended or adjusted under 35 U.S.C. 154(b) by 394 days.

(21) Appl. No.: 17/607,746

(22) PCT Filed: Apr. 27, 2020

(86) PCT No.: PCT/ES2020/070266
§ 371 (c)(1),
(2) Date: Oct. 29, 2021

(87) PCT Pub. No.: WO2020/221947
PCT Pub. Date: Nov. 5, 2020

(65) Prior Publication Data
US 2022/0217986 A1    Jul. 14, 2022

(30) Foreign Application Priority Data
Apr. 30, 2019  (ES) .............................. ESP201930380

(51) Int. Cl.
*A22C 13/00*    (2006.01)

(52) U.S. Cl.
CPC ...... *A22C 13/0003* (2013.01); *A22C 13/0013* (2013.01); *A22C 2013/002* (2013.01); *A22C 2013/0053* (2013.01); *A22C 2013/0096* (2013.01)

(58) Field of Classification Search
CPC ............ A22C 13/0003; A22C 13/0013; A22C 2013/002; A22C 2013/0053
USPC ........................................................... 452/32
See application file for complete search history.

(56) References Cited

U.S. PATENT DOCUMENTS

| 5,955,126 A * | 9/1999 | Jon ..................... A22C 13/0013 426/135 |
| 9,999,233 B1 * | 6/2018 | Dinh Sybeldon .. A22C 13/0013 |
| 2022/0217986 A1 * | 7/2022 | Garcia Martinez ......................... A22C 13/0013 |

FOREIGN PATENT DOCUMENTS

| CA | 713510 A | 7/1965 |
| EP | 1250853 A1 | 10/2002 |
| ES | 2075813 A1 | 10/1995 |
| ES | 2160091 A1 | 10/2001 |

* cited by examiner

*Primary Examiner* — Richard T Price, Jr.
(74) *Attorney, Agent, or Firm* — Holzer Patel Drennan (57) ABSTRACT

The present invention relates to cellulose casings, whether reinforced or not, capable of transferring color to the product stuffed therein. These casings contain a food dye transferable to the stuffed product during processing. The present invention also relates to the method of obtaining the casing and the product stuffed in said casing.

20 Claims, 3 Drawing Sheets

CELLULOSE CASING, METHOD OF OBTAINING IT AND PRODUCT STUFFED IN SAID CASING

The present invention relates to cellulose casings, whether reinforced or not, capable of transferring color to the product stuffed therein. These casings contain a food coloring that is transferable to the stuffed product during processing. The present invention also relates to the method of obtaining the casing and the product stuffed in said casing.

BACKGROUND OF THE INVENTION

Manufacturers of sausages and other stuffed products have a need to give their products an attractive appearance to consumers. Color is an aspect of great importance, and in sausages the resulting color will depend on the type of emulsion and meat used, the processing conditions and whether or not it has undergone a smoking treatment.

For example, traditionally sausages have been colored by applying natural smoke in gaseous form, or also by spraying or immersion in liquid smoke from wood. Depending on the conditions and type of smoking, sausages are obtained with a brown color, ranging from very light beige tones to very dark tones, almost black.

In some markets it is customary to color the surface of the sausage by applying food coloring. For example, in the Philippines the consumption of sausages with a very intense red color is very widespread, which is achieved by applying the Allura Red (E-129) synthetic dye. In addition to the red color, in other markets such as the USA and Australia orange sausages are also obtained by the application of the Sunset Yellow (E-110) synthetic dye. But one of the main disadvantages of using synthetic dyes is that upon transfer to the surface of a sausage, they have a tendency to penetrate the surface and migrate from the surface towards the center of the sausage. Such migration is undesirable, because the customer prefers that only the skin of the coagulated protein surface be colored, and not the interior of the sausage.

Furthermore, when mixtures of these synthetic dyes are used, such migration can occur at different speeds and to different degrees, thus producing a chromatographic effect wherein the sausage in the cross section can have different colored rings. Another limitation of the use of these synthetic colors is that in many countries their use for coloring meat products is not authorized.

On the other hand, in Brazil it is very popular to immerse the sausages once cooked and peeled in a solution of annatto in its water-soluble form (norbixin), in order to obtain a red-orange color. The coloration obtained will depend on the concentration of the dye, the immersion time and the temperature. This water-soluble dye is fixed to the surface of the sausage by means of a second immersion in an acid medium, usually in a phosphoric acid solution.

This method has many disadvantages, such as the need to invest in the facilities to apply the dye (tanks, conveyor belts, filters, among others), maintenance and energy costs, to which the consumption of annatto and other ingredients, and the cost of treating wastewater with due traces should be added. In addition, sausages have easily perceptible color differences, due to the difficulty in ensuring the same residence time and coloring capacity from one day to another.

Likewise, in Chile a type of sausage is marketed, called "Sureña", which also has a red-orange color, but in this case by adding the water-soluble annatto to the meat emulsion, which leads to an unwanted coloration of the inside of the stuffed product. This coloring of the entire meat emulsion entails a higher cost than the superficial coloring of the sausage, because it is necessary to apply a much greater quantity of annatto, which also confers an undesired taste to the product. Another negative point of this practice is that it gives the sausage a very unnatural appearance, since the entire interior of the sausage has an artificial color that causes distrust and displeases consumers.

Finally, it should be noted that there is a strong tendency among consumers in the more developed markets to avoid the use of synthetic dyes, and substitute them with dyes of natural origin, such as annatto, which is a dye that is extracted from annatto seeds, and that has been used since time immemorial by Native Americans.

Several patents describe methods for coloring casings for stuffed products, which are subsequently capable of transferring said dye to the surface of the sausage during the stuffing and cooking processes.

The most common method for producing said coloring casings is the impregnation of the cellulosic gel by passing it through a tank containing a dye solution. As described in patents U.S. Pat. Nos. 2,477,767 and 2,477,768 (Remer et al.). This methodology had problems of dye impregnation heterogeneity as described in patent U.S. Pat. No. 2,521,101 (Thor et al.). U.S. Pat. No. 2,521,101 proposes to obtain a uniformly colored casing with a simple method that improves production performance, such as applying the dye and glycerin in a bath adjusted to pH 7.5-9.5 before drying the cellulosic gel. To avoid yield losses when it is necessary to produce transparent casings again, it is proposed to use a glycerin tank prior to the glycerin and dye tank, which is a movable container, which would be placed only when colored casings are to be produced. In that way, it is not necessary to empty the glycerin and dye tank, clean it and add clean glycerin when producing transparent casings, thus saving production time. When it is necessary to produce colored casings, the mobile glycerin and dye tank is placed again between the glycerin tank and the dryer. Although the color is more uniform, it is necessary to take into account the color variations that occur due to the pH in most dyes, so a suitable mixture that gives the desired color at the pH of the tank should be used. Examples of orange and cherry casings are given in the patent, which transfer the color to the sausage evenly.

This method was later improved by the invention of patent U.S. Pat. No. 3,438,071 (Clark et al.) which describes a simple system to control the level of the tank containing the dye and glycerin. For this purpose, an additional storage tank is placed to which the tank through which the cellulosic gel passes is connected, and which feeds it automatically in response to a drop in level. This allows obtaining casings with a more uniform color tone.

But this cellulosic gel impregnation method is not suitable when the intention is to apply the natural annatto dye, either in its oil-soluble form (bixin) or in its water-soluble form (norbixin). Either due to a lack of chemical affinity, or due to its high molecular size, the cellulosic gel does not substantially absorb these forms of the annatto dye, or if it does absorb it, then it is very difficult for it to be transferred to the sausage. For this reason, when trying to apply annatto to a cellulose casing, the so-called "bubble" or "slug coating" methodology has been commonly used to internally coat the casings.

Both dyes (norbixin and bixin) separately, if used to internally coat cellulosic casings, do not provide good results.

This discovery is disclosed in patent ES 2075813 B1 (Gato et al.), which describes cellulosic casings internally coated with a coating formed by the water-soluble annatto dye, norbixin, and another oil-soluble component (which can be bixin, the other annatto dye), which is transferred uniformly during the processing of the stuffed products made with these casings. Both the casings obtained and the method that uses them to give red-orange coloration to sausages and similar meat products are claimed in the patent. In this case, the coating is a step that must be done offline within the usual processes for obtaining casings, which means that it is not an inexpensive method.

U.S. Pat. No. 5,955,126 (Jon et al) describes compositions of bixin, a water-soluble film-forming agent (preferably hydroxypropylcellulose), a polyphosphate and optionally an antioxidant, as well as casings coated with said composition. In addition to the preferred application by the "bubble" or "slug coating" method, they describe the possibility of applying the dye composition by means of an interior spray during the casing folding step. Its division U.S. Pat. No. 6,143,344 (Jon et al.) claims the dye composition, defined as a dispersion of bixin in a water-soluble and/or alcohol-soluble film-forming agent, with a "grid fineness" (measure of the degree of dye dispersion) of 3 microns or less as defined in ASTM D-1316-87. Both application methods are also described in patent application EP 1250853 A1 (DuCharme et al.). In this case the bixin is applied as a coating, this coating is obtained because the composition has a film-forming agent. In all their embodiments they try to obtain bixin on the internal surface that is in contact with the stuffed product.

Patent application US 2003/0039724 A1 (DuCharme et al.) describes the manufacture of cellulose casings colored in a reddish smoky color, by coating with liquid smoke and/or natural red dyes such as bixin, optionally antioxidants and, optionally a peeling agent. In this case the preferred application method is also the "bubble" or "slug coating". In said application the possibility of applying the dye composition of the invention on the viscose just before the extrusion step is mentioned. Although it is expected that the dyes will be trapped in the casing, and therefore not transferred to the stuffed product, it is believed that liquid fumes and some appropriate red natural dyes that are located on the surface of the casing can be transferred to the stuffed product if, being in contact with the surface of the casing, they are subjected to high temperature.

Finally, patent CA 713510 (A. H. Cameron) mentions a method of spraying a dye solution with caramel that is applied to the inside of the casing once it has been folded, at the time prior to stuffing.

Despite the various inventions described above, today there is no cellulose casing on the market, capable of transferring annatto dye in any of its forms, to the stuffed product. The spraying method of the dye composition carried out during the folding process leads to a very heterogeneous color distribution, due to the fact that the dye accumulates in the pleat folds, giving rise to more intense marks on the surface of sausage.

As for the products prepared by the "bubble" or "slug coating" method, they also have the same problem of heterogeneity of the transferred color, although to a lesser extent. But the main problem with this technology is its high application cost, especially in diameters below 50 mm, since they require an "off-line" application such as that shown in FIG. 1 of U.S. Pat. No. 5,955,126.

That is why, as mentioned above, there is no commercial cellulose casing product capable of transferring annatto dye to the sausage in a homogeneous way, despite strong demand from manufacturers of stuffed products.

DESCRIPTION OF THE INVENTION

Annatto or bija is a dye that is obtained from annatto or orellana (*Bixa orellana* L.), a species originally native to the Amazon basin. It is obtained from the reddish pulp that surrounds the seeds, and is used to color many foods, such as cheeses, margarine, butter, rice, smoked fish. Annatto is the name given to the crude extract, which contains two edible pigments: norbixin, which is water-soluble and is therefore the most abundant in water-soluble extracts of annatto, and oil-soluble annatto dyes that contain bixin as the main dye. Both are carotenoid pigments and therefore can be affected by light and oxygen, which can alter their conjugated double bond structure. Bixin is the monomethylester of norbixin, so norbixin can be obtained from bixin by alkaline saponification.

Bixin formula

Norbixin formula

The aim of the present invention is to overcome the deficiencies presented by the cellulose casings with inner coating of annatto compositions mentioned above. In contrast to prior art casings which are covered with annatto, the present invention provides a cellulose casing whose inner layer is intimately impregnated with annatto, and which is capable of transferring color to the meat stuffed within said casing, in a substantially uniform manner.

The inner layer of the casing that contains the annatto may have different thickness and/or concentration of annatto, which will cause it to acquire different shades after transfer to the stuffed product. When the amount of annatto in said layer is low, the color transfer will also be low, and the color obtained will be a light brown or beige tone, similar to that obtained by subjecting the stuffed product to a light smoking. When said concentration is increased, the transfer increases and the tone of the stuffed product will be substantially red-orange. The final resulting color of the stuffed product will depend, among other factors, on the composition of the meat emulsion and the cooking conditions.

The annatto in the casing of the present invention is distributed throughout the inner layer.

The first aspect of the invention refers to a stuffed product casing comprising two layers of cellulose:

an inner layer whose composition comprises: regenerated cellulose and annatto, wherein the annatto comprises norbixin; and an outer layer comprising regenerated cellulose, concentric to the inner layer; where the casing comprises norbixin and between 50% and 100% by weight of the annatto is distributed in the inner half of the area comprised by said inner and outer layer of the casing.

In the present invention the term "inner layer" refers to any layer that lies between two layers of the casing or between one layer and the stuffed product.

In the present invention, the term "regenerated cellulose" refers to cellulose obtained from the solution of some cellulose derivative such as cellulose xanthate. The solution of some cellulose derivative is transformed into viscose by any of the methods known in the state of the art and the viscose is extruded to obtain regenerated cellulose.

In the present invention the term "annatto" refers to the set of the bixin compound and the norbixin compound, when it refers to a percentage of annatto it refers to the sum of the percentages of the bixin compound and the norbixin compound in the casing. In the case that the hydrolysis of bixin is total, annatto refers only to norbixin.

In the present invention the term $w_{Tcellulose}$ refers to the total weight of regenerated cellulose in the casing, specifically in all the layers that are present in the casing.

A second aspect of the invention is the process for obtaining the casing of the invention.

In the process of the invention the different layers of regenerated cellulose are obtained by extrusion of the viscose. An oily bixin solution is added to one of the inner layers, bixin which is hydrolyzed in a later step.

The present invention avoids the problem of mixing viscose with norbixin, since the mixture undergoes severe dehydration during coagulation, the water being able to carry a large part of the water-soluble dye. Possible subsequent washes in the case of including norbixin in the mixture would also cause additional loss of dye, so that the amount of dye that would remain in the final casing is insufficient for the purpose of transmitting sufficient color to the stuffed product. In addition, the dye strongly contaminates the process fluids.

Bixin in oily solution, which is not soluble in water, does not pollute the washing water. On the other hand, its conversion into norbixin is preferred so that during the cooking process of the meat stuffed in the casing, the water-soluble dye efficiently migrates and transfers a sufficient amount of color for the purpose of this invention. Surprisingly, despite the fact that the process of the invention transforms bixin into norbixin during the manufacturing process, either totally or partially, it remains trapped in the inner layer of the casing and does not significantly contaminate the coagulation-regeneration bath, nor washing water.

Therefore, a second aspect of the invention refers to a process for obtaining the casing defined in the invention that comprises the steps of:
a) adding an oily bixin solution to viscose;
b) extruding in an extruder with a head comprising at least two concentric circuits, the product of step a) in the inner circuit and viscose in the outer circuit:
c) hydrolyzing bixin to norbixin after step a) or after step b).

In the present invention the term "oily bixin solution" refers to oily solutions of bixin or solutions, suspensions or emulsions. These oily bixin solutions comprise between 0.1% and 20% bixin.

In the present invention (w/w$_{viscose}$) refers to the ratio between the weight of the bixin oily solution and the weight of viscose that is used to form the bixin layer.

In step b) in the present invention that comprises at least two concentric circuits, it is understood that the head has two, three, four or five or more concentric circuits.

A stuffed product casing obtainable by the process defined in the invention is also an aspect of the invention.

Another aspect of the invention is the use of the casing of the invention in the production of stuffed products.

Another aspect of the invention is a product stuffed in the casing of the invention. A final aspect is the method for obtaining the stuffed product in the casing of the invention, which comprises the steps of: a) stuffing a mixture of stuffed meat into the casing of the invention; b) cooking the stuffed mixture; c) removing the casing.

DESCRIPTION OF A PREFERRED EMBODIMENT

As mentioned above, the first aspect of the invention refers to a casing for stuffed product comprising two layers of cellulose:
an inner layer whose composition comprises: regenerated cellulose and annatto, wherein the annatto comprises norbixin; and an outer layer comprising regenerated cellulose, concentric to the inner layer; wherein the casing comprises norbixin and between 50% and 100% by weight of the annatto is distributed in the inner half of the area comprised by said inner and outer layer of the casing.

In a preferred embodiment, the annatto is comprised between 0.05% (w/w$_{Tcellulose}$ and 20% (w/w$_{Tcellulose}$), more preferably between 0.2% (w/w$_{Tcellulose}$ and 5% w/w$_{Tcellulose}$).

Preferably the casing does not have an inner annatto coating.

In a preferred embodiment, the regenerated cellulose is reinforced regenerated cellulose. In the present invention the term "reinforced regenerated cellulose" refers to regenerated cellulose reinforced with natural or synthetic cellulose-based fibers, or with regenerated cellulose-based fibers treated with agents that improve mechanical properties. In a preferred embodiment, the cellulose is reinforced with paper. In a particular embodiment, the casing has three concentric layers, an inner viscose layer, an intermediate long fiber paper layer, and a third outer viscose layer. In particular, the long fiber paper is abaca.

In a preferred embodiment, the number of layers of the casings of the invention is selected from two to three.

As it has been said, a second aspect of the invention refers to a process for obtaining the casing defined in the invention that comprises the steps of:
a) adding an oily bixin solution to viscose;
b) extruding in an extruder with a head comprising at least two concentric circuits, the product of step a) in the inner circuit and viscose in the outer circuit:
c) hydrolyzing bixin to norbixin after step a) or after step b).

In a preferred embodiment, the amount of the oily bixin solution that is added to the viscose in step a) is comprised between 0.05% (w/w$_{viscose}$ and 25% (w/w$_{viscose}$). In a more preferred embodiment, the amount of the oily bixin solution that is added to the viscose in step a) is between 5% (w/w$_{viscose}$) and 20% (w/w$_{viscose}$).

In a preferred embodiment, the step of hydrolyzing bixin to norbixin is carried out after step a) in a step prior to step b) of extrusion; in this new step, the bixin is mixed with the viscose for a time between 0.5 minutes and 24 hours. More preferably between 30 minutes and six hours. Most preferably the mixing is done in a uniform manner by a mechanical mixing system, either statically or dynamically.

In another preferred embodiment, the step of hydrolyzing bixin to norbixin is carried out after step b) by subjecting the product obtained in step b) to a treatment with an alkaline compound. More preferably the treatment is a bath in a solution of an alkaline compound in a range of concentration by weight between 0.1% and 10%. More preferably the alkaline compound is NaOH, KOH, amines or ammonium hydroxide, more preferably the solution is comprised of a concentration by weight of 0.1% to 10% of NaOH or KOH. More preferably the time is between 0.5 and 5 minutes and the temperature between 40° C. and 70° C. In particular, it is a 2% KOH solution for a time between 1 and 5 minutes at a temperature between 40° C. and 90° C.

In the present invention the term "alkaline compound" refers to a hydroxide, to a carbonate or bicarbonate of an alkali or alkaline earth metal, to an ammonium hydroxide or salts thereof, or to an amine. Preferably, the alkaline compound is selected from: NaOH, KOH, methylamine, dimethylamine, trimethylamine, ethylamine, among others, and NH$_4$OH. In particular it is KOH.

Step a) of the method takes place significantly at a temperature below 40° C., preferably between 20° C. and 40° C., with a temperature of 20° C. to 25° C. being more preferable.

The amount of oily bixin solution in step a) is preferably in an amount of 0.05% to 25%. More preferably between 0.05% to 3% if it is intended to obtain a beige or light brown color in the sausage stuffed in said casing, from 3% to 8% if a yellowish orange color is desired or from 8% to 25%, if it is intended to obtain a more red-orange tone.

Preferably, the process comprises in any of the embodiments of the invention a final step of passing through a plasticizing bath. Preferably the plasticizing bath comprises glycerin.

In a preferred embodiment, the hydrolysis step is carried out after step b) before the plasticizing bath step by bathing the product obtained in step b) in a bath of a hydrolytic enzyme. In particular the enzyme is a lipase enzyme. Preferably the enzyme is between 2 g/l and 10 g/l. More preferably between 3 g/l and 5 g/l. Preferably, the bath lasts between 30 minutes and 180 minutes. Preferably the bath is at a temperature between 30° C. and 40° C.

In general, in the processes for obtaining casings, there is a step of folding or corrugated the casing. During this stage it is usual to internally spray an aqueous solution containing ingredients that increase the plasticity of the casing or also facilitate the subsequent peeling and separation of the casing from the sausage, such as carboxymethylcellulose or CMC.

In the present invention, in a particular embodiment, said folding compositions can incorporate an alkaline compound, preferably selected from: KOH, NaOH, amines or NH$_4$OH, which will hydrolyze the bixin present in the inner layer of the casing of the invention in water-soluble norbixin. The corrugated casings can be stored at temperatures up to 90° C. to accelerate said reaction, but preferably they are stored at temperatures between 20 and 40° C., for a time that can be from several minutes to several months. The concentration of the alkaline compound in these folding compositions can vary from 0.1% to 10% by weight, more preferably between 0.5 to 3%.

As it has been said, another aspect of the invention is the use of the casing of the invention in the production of stuffed products and a final aspect of the invention is a product stuffed in the casing of the invention. In both cases in a particular way the stuffed product is sausage.

In a last particular embodiment of the method of obtaining the stuffed product, the stuffed product without casing, after removing the casing, is immersed in an acid solution, preferably in a phosphoric acid solution. Preferably between 30 seconds and 5 minutes. The phosphoric acid solution is preferably at a concentration by weight of between 5% and 10%.

EXAMPLES

The following examples are only illustrative of this invention, and should not be construed in a limiting sense thereof.

In all examples the methods for quantifying the color transmission capacity in the prepared samples are as follows.

Methods

The following methods have been used for the quantification of the color transmission capacity of the samples prepared in the examples of the invention.

Lab Test

Hunter L, a, b values are a standard method for quantifying the color scale of a product. This method shows the differences in brightness, tone, and color saturation. L parameter indicates the brightness of the color, the value 100 corresponding to white, and the value zero to black. Parameter a indicates the gradient from red to green, representing a redder color as a increases. Parameter b indicates the gradient from yellow to blue, and as it increases it indicates that the color is more yellow.

In the examples of the invention, the Hunter L, a, b color scale was used to measure the color of cellulose casings and sausages from which the casing has been removed, to quantify the color that said casing has transmitted. In the case of the casings, the measurement was carried out on two superimposed layers and placed on a white tile. In the case of the sausages, they have been covered with a transparent plastic film, and the measurement was made by placing the colorimeter directly on them. The plastic film prevents contamination and fouling of the colorimeter. The value obtained was the mean value of 5 measurements. A model Ci62S colorimeter from the X-rite brand was used.

Removable Color

This method allows us to quantify the color transmission capacity of a cellulose casing. In the examples of the invention, this method was used to determine said color transmission capacity of regenerated viscose films and cellulose casings. The method consists in placing the sample in an Erlenmeyer flask with 250 ml of KOH 0.008% w/v, which has been prepared by diluting one gram of 2% KOH solution to 250 ml. Subsequently, the Erlenmeyer flask is placed on a hot plate until it boils, and is kept for 5 minutes. After allowing cooling, the sample is removed and the absorbance of the supernatant at 480 nm is measured. In the measurements of the examples of the invention, a spectrophotometer model US/VIS Lambda 365 from the Perkin Elmer brand was used. The higher the absorbance, the higher the annatto concentration, and therefore the higher the color transmission capacity of the sample.

Example 1

In this example, a colored casing was prepared with an extruder as described in patent ES 2160091 B1 (de Garcia et al.).

The cellulose was regenerated from viscose. The viscose had an alkali content equivalent to 6% NaOH.

A three-layer casing was made in which bixin was injected into the viscose of an inner layer of the casing, in this case the center layer.

To carry out this example, bixin was selected in dispersion in oil from the brand Imbarex annatto oil suspension 10% AOS.10.

The dye was injected into the viscose that is extruded through the center layer of the extruder. For this purpose, an Iwaki diaphragm pump model EWNB11VCER and a dynamic mixer were used.

The amount injected into viscose was 18.4% by weight with respect to the viscose of the central layer, and 3.68% with respect to the total viscose that constitutes 4.84% of annatto based on total cellulose. The injection was carried out 15 minutes before the time of extrusion.

The process fluids inside the casing were not detected to be contaminated with the dye at first sight.

The casing obtained was stuffed with a typical meat emulsion for the manufacture of "hot dogs", they were cooked in a cycle without smoking, as described in Table 1, and subsequently the sausages were peeled and it was observed that surprisingly a certain transmission of color from the casing to the sausage had occurred, obtaining sausages with a beige surface color, similar to that obtained with slightly intense smoking.

TABLE 1

Description of the "hot dogs" cooking process

| Step | t min | ° C. | RH % |
|---|---|---|---|
| drying | 15 | 60 | 0 |
| ctrl HR 1 | 15 | 70 | 40-50 |
| ctrl HR 2 | 20 | 85 | 70-80 |
| brine shower | 3 | 0 | — |

Figure 1:
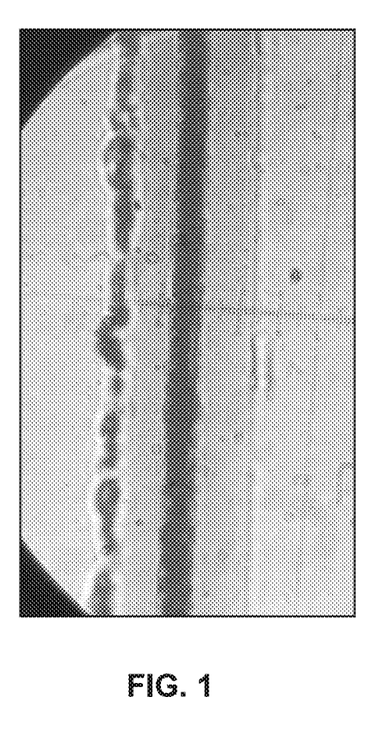
FIG. 1 shows a cross section of the wall of the multilayer casing obtained in example 1. The left part is the uncolored outer layer having a thickness of 9.9 µm, the central part is the annatto colored inner layer and having a thickness of 4.9 µm, and the right part is the uncolored inner layer having a thickness of 9.9 µm.

This result shows that the phenomenon of color transmission is not only due to surface contact of the casing and the meat emulsion, but that some other phenomenon hitherto unknown is involved. In order to investigate this phenomenon, a transverse section of the casing wall was made and the structure was studied with optical microscopy. FIG. 1 shows the presence of three concentric layers, an outer (left side of the image) non-colored 9.9 μm thick layer, a central colored 4.9 μm thick layer, and an inner (right side of image) 9.9 μm thick layer.

In addition, it is observed that the annatto has not been confined in the central layer, since it is what would be expected of the bixin because it is oil soluble, but there is diffusion of color to the inner and outer layers of dye, which could only be annatto in water-soluble form (norbixin) to be able to migrate through a matrix as hydrophilic as regenerated cellulose.

Example 2

In the present example, it is intended to maximize the transfer of color by extruding a bilayer casing, that is, it has two concentric layers, an outer one without annatto dye and an interior one with annatto, which will transmit the color to the stuffed product.

Figure 2:
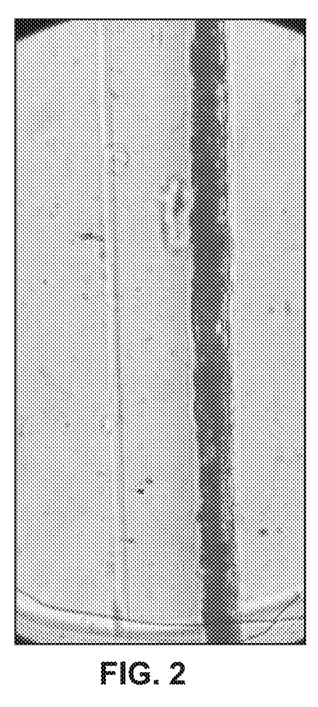
FIG. 2 shows a cross section of the wall of a bilayer casing. The left part is the uncolored outer layer with a thickness of 18 µm, and the right part is the colored inner layer with a thickness of 6.9 µm.

FIG. 2 shows a cross section of the casing wall under the microscope, wherein an uncolored outer 18 μm thick layer (left part) and a colored inner 6.9 μm thick layer (right part) can be seen. In addition, different casings have been prepared with different concentrations of bixin in the inner layer.

The bixin selected for this example has been Imbarex annatto oil suspension 10% AOS.10, the same as that of example 1. The dye was injected into the viscose that is extruded through the inner layer of the extruder, using the same pumping and mixing equipment than Example 1.

The injected amount comprises from 6%, 8%, 10%, 12%, 15% and 18% by weight with respect to the viscose extruded by the inner layer, and from 0.36%, 0.48%, 0.60%, 0.72%, 0.90% and 1.08% with respect to the total extruded viscose and which constitute 0.47%, 0.63%, 0.79%, 0.95%, 1.18% and 1.42% respectively of bixin based on total cellulose. The contact time of the bixin with the viscose was increased to 30 minutes.

As in Example 1, the casing could be rolled up without problems, giving rise to a compact coil, and after corrugating a manageable product was obtained, similar in properties to that obtained with non-colored casings. And like Example 1, the process liquids inside the casing were not detected at first sight to be contaminated with the dye.

The 6 casings obtained and one more without coloring (negative control), were stuffed with a typical meat emulsion for the manufacture of "hot dogs" and later the sausages were peeled and the color L, a, b was measured as described in the Methods section.

Table 2 shows the results obtained.

TABLE 2

L, a, b values of "hot dogs" stuffed with bilayer casings with different concentration of bixin in the inner layer.

| % Bixin with respect to weight of viscose of the inner layer | L | a | b |
|---|---|---|---|
| 0% | 67.2 | 6.7 | 19.3 |
| 6% | 62.1 | 23.4 | 46.6 |
| 8% | 62.2 | 23.7 | 47.4 |
| 10% | 62.4 | 23.9 | 46.7 |
| 12% | 61.2 | 26.8 | 55.9 |
| 15% | 59.2 | 29.9 | 61.8 |
| 18% | 58 | 30.8 | 64.9 |

A significant color transfer is observed with respect to the negative control, and the intensity of said color increases as the injected concentration of bixin increases in the inner layer of the casing. The higher the concentration, the L value decreases, the sausage is darker, the a value increases, the sausage is redder, and the b value increases, which indicates that the sausage is more yellow. The simultaneous increase of the a and b values, indicate that overall the sausage is more orange the higher the dye concentration.

Subsequently, a method was applied that allows us to increase the red tone of the sausages prepared with the casings of the present invention. For this purpose, the peeled sausages that had been prepared with 18% bixin of the present example were taken and immersed in a 5% phosphoric acid solution at 20° C. for one minute (for the preparation of the solution, phosphoric acid was used 85% of PANREAC). The action of the acid causes a reddening of the sausage, a coloration that is preferred by some consumers The color L, a, b of the sausages was measured as described in the Methods section. Table 3 shows the results obtained.

TABLE 3

L, a, b values of "hot dogs" stuffed with the casings of the present example with 18% bixin annatto in the inner layer

| Sample | Phosphoric acid treatment 5% (s) | L | a | B |
|---|---|---|---|---|
| 1 | 0 | 58.0 | 30.8 | 64.9 |
| 2 | 60 | 58.5 | 32.4 | 62.2 |

Treatment of the sausage with phosphoric acid does not significantly alter the L value, that is, the sausage maintains its luminosity, but causes an increase in the a value, the sausage is redder, and a decrease in the b value, which indicates that the sausage is less yellow, and taking these values together, that the sausage prepared with sample 2 shows a more reddish color.

Example 3

In the present example, the sample from Example 2 containing 12% bixin relative to the weight of the viscose of the inner layer was taken and hot dogs were prepared with a typical emulsion to which 0.06% carmine 25% L-OD from the supplier Sensient was added to give it a more rosy tone. Sample 1 was prepared with a casing without dye, samples 2 and 3 with the aforementioned casing from Example 2, but in the case of sample 3 it had been turned over, so that the uncolored outer layer of the casing was in direct contact with the meat emulsion. The sausages were cooked in an oven cycle without smoking, but with higher relative humidity in order to increase the diffusion of the dye, as described in Table 4.

TABLE 4

Description of the "hot dogs" cooking process.

| Step | t min | ° C. | RH % |
|---|---|---|---|
| drying | 15 | 60 | 0 |
| ctrl HR | 30 | 85 | 100% |
| brine shower | 3 | 0 | — |

Subsequently, the color L, a, b of the sausages was measured as described in the Methods section. The results obtained are shown in Table 5.

TABLE 5

L, a, b values of "hot dogs" stuffed with casings (1) without dye, (2) with 12% bixin annatto in the inner layer and (3) casing (2) but turned over.

| Sample | Treatment | L | a | B |
|---|---|---|---|---|
| 1 | Without dye | 60.9 | 14.2 | 18.9 |
| 2 | 12% bixin inner layer | 55.0 | 19.9 | 44.5 |
| 3 | 12% bixin inner layer and turned over | 56.7 | 16.4 | 28.8 |

It is observed that in samples 2 and 3 the transfer of dye to the sausage takes place, and that this is much less in the case in which the casing has been stuffed turned over, due to the difficulty encountered by the dye to migrate through the uncolored cellulose layer. This difference in color transmission would indicate that the most efficient casing for the purpose of the invention is the one that presents most of the dye in the inner half of the casing.

Example 4

The cellulose casings prepared in the present example 4 show different contact times between the bixin and the viscose. In this example, the selected bixin has been Bixinex oil soluble 10% Liquid (NBX 36) from the manufacturer Pronex. The dye was injected into the viscose that is extruded through the inner layer of the extruder. In sample 1, the bixin was injected into the viscose 15 minutes before the time of extrusion and the injected amount was 14% by weight with respect to the viscose of the inner layer and 0.98% with respect to the whole of the extruded viscose which constitutes 1.29% of bixin based on total dry cellulose. In sample 2, the bixin dye was injected into the viscose 4.5 hours before the time of extrusion and the injected amount was 13.2% by weight with respect to the viscose of the inner layer and 0.94% with respect to all the extruded viscose that constitutes 1.23% of bixin based on total regenerated cellulose. As in previous examples, the process liquids inside the casing were not detected at first sight to be contaminated with the dye.

Both casings were stuffed with a typical meat emulsion for the manufacture of "hot dogs", and subsequently the sausages were peeled and their color L, a, b measured as described in the Methods section. Table 6 shows the results obtained.

TABLE 6

L, a, b values of "hot dogs" stuffed with bilayer casings with different contact time with alkaline viscose.

| Sample | Viscose annatto contact time (h) | L | a | B |
|---|---|---|---|---|
| 1 | 0.25 | 61.0 | 26.0 | 44.0 |
| 2 | 4.5 | 60.1 | 29.4 | 57.9 |

An increase in the capacity to transfer color is observed with sample 2, which has been in contact with the viscose for a longer period of time. The longer the contact time, the L value decreases, the sausage is darker, the a value increases, the sausage is redder, and the b value increases, which indicates that the sausage is more yellow, and taking these values together, that the Sausage prepared from Sample 2 shows a more orange color.

Example 5

In the present example, the effect of a post-extrusion treatment with a KOH solution has been studied.

In this example, the selected bixin annatto has been Imbarex annatto oil suspension 10% AOS.10. The dye was injected into the viscose being extruded through the inner layer of the extruder.

Two samples were prepared and in both the bixin was injected into the viscose 10 minutes before the time of extrusion, the amount injected being 12% by weight with respect to the viscose of the inner layer and 1.2% with respect to the whole of the extruded viscose that constitutes 1.58% of bixin based on total dry cellulose. Sample 1, or control, was passed through the different process tanks in a standard way. Instead, sample 2 was passed through an additional tank, which was positioned prior to the plasticizing tank. Said tank contained a 2% by weight of KOH solution at a temperature of 65° C. The passage time of the cellulosic gel was 2 to 3 minutes. After being subject to this alkaline treatment, it was passed through a tank with water, to remove excess KOH, and then through the plasticizing tank. At first sight it was observed that the resulting casing had a more orange tone than the control. As in previous examples, it was detected at first sight that in neither of the two samples the process liquids inside the casing were contaminated with the dye.

Figure 3:
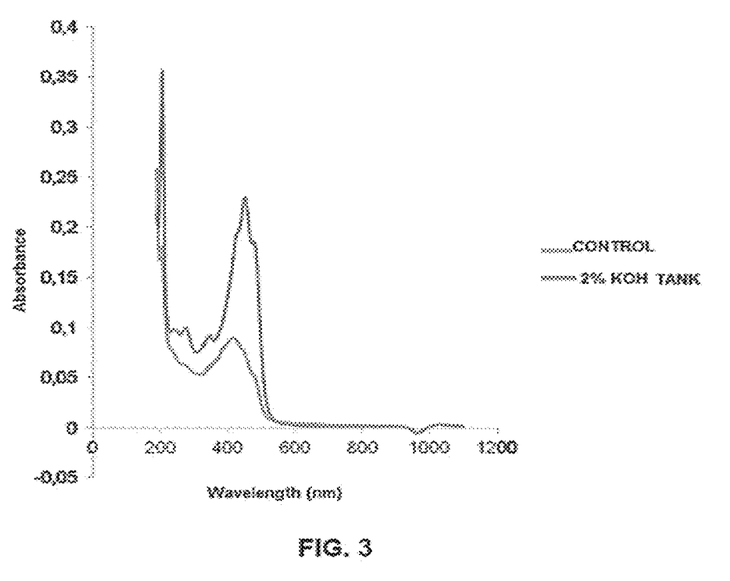
FIG. 3 shows an absorption spectrum of the transferable dye of two regenerated cellulose casings: (1) Control (2) Treatment of cellulosic gel with 2% KOH according to example 4.

25 cm of casing film was taken, cut on one of its sides in the longitudinal direction and placed in an Erlenmeyer flask with 250 ml of 0.008% weight/volume KOH. The Erlenmeyer flask was boiled for 5 minutes and after cooling the supernatant the spectrum was measured under visible light. The result shows that the casing that was subjected to the treatment in a KOH tank (sample 2) underwent a transformation that caused an increase in absorbance in the wavelength range of 400-600 nm, which indicates that said casing has greater color transmission capacity (FIG. 3).

Both casings were stuffed with a typical meat emulsion for the manufacture of "hot dogs". Subsequently, the sausages were peeled and their color L, a, b measured as described in the Methods section. Table 7 shows the results obtained.

TABLE 7

L, a, b values of "hot dogs" stuffed with
standard bilayer casings and with
cellulosic gel treatment with 2% KOH.

| Sample | 2% KOH tank gel treatment (s) | L | a | B |
|---|---|---|---|---|
| 1 | 0 | 59.5 | 25.2 | 49.2 |
| 2 | 150 | 58.2 | 29.2 | 58.8 |

An increase in the capacity to transfer color is observed with sample 2, which has been subjected to a treatment with a 2% KOH solution at 65° C. for 150 s. Said treatment results in a decrease in the L value, that is, the sausage is darker, an increase in the a value, the sausage is redder, and in the b value, which indicates that the sausage is more yellow, and taking these values together, that the sausage prepared with sample 2 shows a more orange color.

Example 6

From the casing of sample 1 of example 5, folded samples with 4 different additives were prepared according to methods known in the art. Folding additives are compositions that are sprayed on the inside of the casing during the folding operation.

Its main function is to provide the casing with greater plasticity and thus overcome the folding step without suffering an appreciable deterioration of its mechanical properties. Furthermore, it is common in the art to apply folding additives that also make the casing easier to separate from the stuffed product in the peeling step, referred to as "easy peeling" additives. These compositions usually have carboxymethylcellulose (CMC) as the main agent that favors the sausage peeling. Table 8 shows the type of folding compositions used in the present example.

TABLE 8

Description of the composition of the folding additives

| Folding additive | "Easy peeling" | KOH |
|---|---|---|
| 1[a] | No | 0 |
| 1B | No | 0.5% |
| 2[a] | Yes | 0 |
| 2B | Yes | 0.5% |

Additive 1 is a composition that does not have CMC, and that does not have the function of promoting the peeling of the sausage, and that is normally used in casings whose purpose is to be peeled by the end consumer, not by the manufacturer of the stuffed product. The composition of additive 1A comprises 30% propylene glycol and 70% water, as described in Example IX of U.S. Pat. No. 3,981,046 by H. Chiu. In composition B, KOH was added to said additive until reaching a concentration of 0.5%. On the contrary, additive 2 is a typical composition that has CMC to favor the mechanical peeling of the sausages by the manufacturer of the stiffed products. The composition of additive 2A comprises 1.42% CMC, 1.5% polysorbate 80, 57.08% propylene glycol and 40% water, as described in Example III of U.S. Pat. No. 3,898,348 by H. Chiu. Likewise, in composition B, KOH was added to said additive until reaching a concentration of 0.5%.

The folding conditions with the four additives were standard, not observing differences in performance in the folding operation, nor in the properties of the resulting corrugated product. The samples were packaged and stored at room temperature.

Two weeks after being folded, the four casings were stuffed with a typical meat emulsion for the manufacture of "hot dogs" as described in example 1, and subsequently the sausages were peeled and the color L, a, b was measured, as described in the Methods section. Table 9 shows the results obtained.

TABLE 9

L, a, b values of "hot dogs" stuffed with folded
bilayer casings with different folding additives:
standard (1A and 2A) and
with 0.5% KOH (1B and 2B).

| Sample | L | a | B |
|---|---|---|---|
| 1A | 61.3 | 20.8 | 52.4 |
| 1B | 60.7 | 21.5 | 55.5 |
| 2A | 60.7 | 20.3 | 55 |
| 2B | 60.0 | 23.1 | 57.9 |

When comparing with their respective control, an increase in the capacity to transfer color of samples 1B and 2B is observed, whose folding composition contained 0.5% KOH. Said compositions give rise to a decrease in the L value, that is, the sausage is darker, an increase in the a value, the sausage is redder, and in the b value, which indicates that the sausage is more yellow, and taking these values together, that the sausages prepared with samples 1B and 2B show a more orange color.

Example 7

In the present example the effect of the hydrolytic enzyme on the casing has been studied. Lipase enzymes (hydrolytic enzyme) are tested for their capacity to hydrolyze ester groups, and cause the transformation of bixin into norbixin. In this example, the selected bixin was Imbarex annatto oil suspension 10% AOS.10. The dye was injected into the viscose that is extruded through the inner layer of the extruder. Two samples were prepared and in both the bixin dye was injected into the viscose 15 minutes before the time of extrusion, the injected amount being 14% by weight with respect to the viscose of the inner layer and 1.4% with respect to the set of the extruded viscose that constitutes 1.84% bixin based on total dry cellulose. Sample 1, or control, was passed through the different process tanks in a standard way. Instead, sample 2 was passed through an additional tank, which was positioned prior to the plasticizing tank. Said tank contained a lipase enzyme solution at a concentration of 5 g/L and a temperature of 35° C. The cellulosic gel treatment time was 120 minutes. After subjecting the gel to this enzymatic treatment, it was passed through a tank with water, to wash off the remains of lipase enzymes, and then through the plasticizing tank. The resulting casing had a more orange tone than the control. As in previous examples, it was detected at first sight that in neither of the two samples the process liquids inside the casing were contaminated with the dye.

Both casings were stuffed with a typical meat emulsion for the manufacture of "hot dogs", and subsequently the sausages were peeled and their color L, a, b measured as described in the Methods section. Table 10 shows the results obtained.

TABLE 10

L, a, b values of "hot dogs" stuffed with standard bilayer casings and with cellulosic gel treatment with lipase enzymes (hydrolytic enzyme), at a concentration of 5 g/L.

| Sample | Cellulosic gel enzymatic treatment (min) | L | a | b |
| --- | --- | --- | --- | --- |
| 1 | 0 | 58.9 | 21.8 | 47.6 |
| 2 | 120 | 57.6 | 22.9 | 49.7 |

An increase in the capacity to transfer color is observed with sample 2, a casing that has been subjected to an enzymatic treatment with a solution of 5 g/L of lipases at 35° C. for 120 minutes. Said treatment results in a decrease in the L value, that is, the sausage is darker, an increase in the a value, the sausage is redder, and in the b value, which indicates that the sausage is more yellow, and taking these values together, that the sausage prepared with sample 2 shows a more orange color.

Example 8

In the present example a paper reinforced cellulose casing, commonly referred to as "Fibrous", has been prepared. These casings normally have three concentric layers, an inner viscose, an intermediate long-fiber paper, usually abaca, and a third outer viscose layer. In the extrusion process, the paper is shaped into a tubular shape, and the outer and inner viscose that impregnate said paper are extruded. After impregnation with the viscose, the tube is passed through the coagulation-regeneration tanks, the washing and plasticizing tanks, and finally it is dried and wound on coils. This product can be supplied to the manufacturer of stuffed products directly in coils or corrugated. In this example, the selected bixin annatto has been Bixinex oil soluble 10% Liquid (NBX 36) from the manufacturer Pronex. Abaca tubular paper provided by the manufacturer Ahlstrom was impregnated with inner and outer viscose. 12.5% of the total viscose made up the inner layer and the remaining 87.5% the outer layer of the casing. The bixin was injected into the viscose of the inner layer 45 minutes before the time of extrusion and the injected amount was 10% by weight with respect to the viscose of said inner layer and 1.25% with respect to the whole of the extruded viscose which constitutes 1.64% of bixin based on total regenerated cellulose.

Subsequently, a standard casing and the casing obtained in the present example were stuffed with a typical meat emulsion of mortadella. The stuffed products were cooked in a cycle without smoking, and subsequently peeled and it was observed whether color transmission from the casing to the mortadella had occurred. The color L, a, b of the mortadellas was measured as described in the Methods section. Table 11 shows the results obtained.

TABLE 11

L, a, b values of mortadella stuffed with standard "Fibrous" casings and with injection of annatto bixin in the inner viscose layer.

| Sample | Fibrous | L | A | B |
| --- | --- | --- | --- | --- |
| 1 | Standard | 72.5 | 4.6 | 21.8 |
| 2 | Test | 58.8 | 30.2 | 67.0 |

A significant color transfer is observed with respect to the standard "Fibrous" casing, reflected in the decrease of the L value, and the increase of the a and b values. The mortadella had an attractive orange color on its surface. As in all the previous examples, no migration of the annatto dye into the stuffed product is detected, but it remains on the surface throughout the useful life of the product.

The invention claimed is:
1. A casing for stuffed products comprising two layers of cellulose including:
   an inner layer comprising regenerated cellulose and annatto, wherein the annatto comprises norbixin; and
   an outer layer comprising regenerated cellulose concentric to the inner layer, wherein the casing comprises norbixin and between 50% and 100% by weight of the annatto is distributed in an inner half of an area comprised by the inner and the outer layer of the casing.
2. The casing according to claim 1, wherein the annatto is comprises between 0.05% ($w/w_{Tcelulose}$) and 20% ($w/w_{Tcelulose}$).

3. The casing according to claim 1, wherein the regenerated cellulose is reinforced regenerated cellulose.

4. A method for obtaining a casing for stuffed products comprising two layers of cellulose including:
an inner layer comprising regenerated cellulose and annatto, wherein the annatto comprises norbixin; and
an outer layer comprising regenerated cellulose concentric to the inner layer, wherein the casing comprises norbixin and between 50% and 100% by weight of the annatto is distributed in an inner half of an area comprised by the inner and the outer layer of the casing, the method comprising:
adding an oily bixin solution to the viscose;
extruding in an extruder with a head comprising at least two concentric circuits, an inner circuit and an outer circuit, a product of adding the oily bixin solution to the viscose in the inner circuit and viscose in the outer circuit; and
hydrolyzing bixin to norbixin after after adding the oily bixin solution to the viscose.

5. The method according to claim 4, wherein the oily bixin solution is added to the viscose in an amount between 0.05% ($w/w_{viscose}$) and 25% ($w/w_{viscose}$).

6. The method according to claim 4, wherein the oily bixin solution is added to the viscose in an amount between 0.05% ($w/w_{viscose}$) and 3% ($w/w_{viscose}$).

7. The method according to claim 4, wherein the oily bixin solution is added to the viscose in an amount between 3% ($w/w_{viscose}$) and 8% ($w/w_{viscose}$).

8. The method according to claim 4, wherein the oily bixin solution is added to the viscose in an amount between 8% ($w/w_{viscose}$) and 25% ($w/w_{viscose}$).

9. The method according to of claim 4, wherein hydrolysis is carried out after the extruding operation by subjecting a product of the extruding operation to a bath in a solution of 0.1% to 10% concentration by weight of an alkaline compound.

10. The method according to claim 9, wherein the alkaline compound is selected from: NaOH and KOH.

11. The method according to claim 4, wherein hydrolysis is carried out after adding the oily bixin solution to the viscose in a step prior to the extruding operation, wherein the oily bixin solution is mixed with the viscose for a time between 0.5 minutes and 24 hours.

12. The method according to claim 11, wherein the mixing time is between 30 minutes and six hours.

13. The method according to claim 4, further comprising: passing the norbixin through a plasticizer bath.

14. The method according to claim 13, wherein the hydrolyzing operation is carried out after the extruding operation and before passing the norbixin through the plasticizer bath by bathing a product of the extruding operation in a bath of a hydrolytic enzyme.

15. The method according to claim 14, wherein the hydrolytic enzyme is between 2 g/l and 10 g/l.

16. The method according to claim 4, further comprising:
folding or corrugated the casing, wherein the hydrolyzing operation is carried out after the extruding operation in the folding or corrugating step by applying a folding composition comprising an alkaline compound in a concentration between 0.1% and 10% by weight.

17. The method according to claim 16, wherein the alkaline compound is selected from KOH and NaOH.

18. A casing for a stuffed product obtained by:
adding an oily bixin solution to viscose;
extruding in an extruder with a head comprising at least two concentric circuits, an inner circuit and an outer circuit, a product of adding the oily bixin solution to the viscose in the inner circuit and viscose in the outer circuit; and
hydrolyzing bixin to norbixin after the extruding operation.

19. A product stuffed in the casing of claim 18.

20. The product stuffed in the casing according to claim 19, wherein the product is a sausage.

* * * * *